United States Patent [19]

Macheras

[11] Patent Number: 5,635,067
[45] Date of Patent: Jun. 3, 1997

[54] FLUID SEPARATION MEMBRANES PREPARED FROM BLENDS OF POLYIMIDE POLYMERS

[75] Inventor: James T. Macheras, Quincy, Mass.

[73] Assignee: Praxair Technology, Inc., Danbury, Conn.

[21] Appl. No.: 404,208

[22] Filed: Mar. 14, 1995

[51] Int. Cl.[6] ................................................. B01D 69/08
[52] U.S. Cl. ........................ 210/500.23; 96/8; 210/500.39
[58] Field of Search ........................ 210/500.23, 500.39; 95/54, 55; 96/14, 8, 10

[56] References Cited

U.S. PATENT DOCUMENTS

| | | | |
|---|---|---|---|
| 3,899,309 | 8/1975 | Hoehn et al. | 29/16 |
| 4,001,186 | 1/1977 | Onder | 260/63 |
| 4,230,463 | 10/1980 | Henis et al. | 55/16 |
| 4,440,643 | 4/1984 | Makino et al. | 210/500 |
| 4,826,599 | 5/1989 | Bikson et al. | 210/500 |
| 4,871,500 | 10/1989 | Harms et al. | 264/178 |
| 4,880,442 | 11/1989 | Hayes | 55/16 |
| 4,932,982 | 6/1990 | Hayes | 55/16 |
| 4,932,983 | 6/1990 | Hayes | 55/16 |
| 5,015,270 | 5/1991 | Ekiner et al. | 556/16 |
| 5,061,298 | 10/1991 | Burgoyne, Jr. et al. | 55/16 |
| 5,067,970 | 11/1991 | Wang et al. | 55/16 |
| 5,076,935 | 12/1991 | Kraus et al. | 210/651 |
| 5,085,676 | 2/1992 | Ekiner et al. | 55/158 |
| 5,102,718 | 4/1992 | Tingerthal et al. | 428/209 |
| 5,181,940 | 1/1993 | Bikson et al. | 55/16 |
| 5,189,116 | 2/1993 | Boyd et al. | 525/423 |
| 5,242,748 | 9/1993 | Folda et al. | 428/272 |
| 5,248,319 | 9/1993 | Eikner et al. | 95/54 |
| 5,248,711 | 9/1993 | Buyny et al. | 523/500 |
| 5,431,367 | 7/1995 | Baumgarther et al. | 249/114.1 |

*Primary Examiner*—Frank Spear
*Attorney, Agent, or Firm*—Robert J. Follett

[57] ABSTRACT

Anisotropic fluid separation membranes having an integral discriminating layer are formed from blends of two types of polyimides. The first type is a phenylindane containing polyimide. The second type consists of polyimides formed from the reaction of benzophenone tetracarboxylic dianhydride (BTDA) and optionally pyromellitic dianhydride (PMDA), with toluene diisocyanate (TDI) and/or 4,4'-methylene-bis-phenylisocyanate (MDI). The ratio of Type 1 polymer to Type 2 polymer is 1 or less. The blend membranes are particularly useful for gas separation.

20 Claims, No Drawings

FLUID SEPARATION MEMBRANES PREPARED FROM BLENDS OF POLYIMIDE POLYMERS

FIELD OF THE INVENTION

This invention describes preparation of improved membranes for fluid separations from blends of polyimide polymers. It was found that membranes fabricated from these blends are particularly useful for gas separations and exhibited unexpectedly good gas separation properties.

BACKGROUND OF THE INVENTION

Preparation of polymeric membranes for fluid and gas separation applications are well documented in the art. In order for a polymer to qualify as a suitable membrane forming and fluid separation material, it must meet several performance criteria that depend on the desired end use of the membrane. Among the factors that will influence the choice of a polymer are its mechanical strength, chemical resistance, thermal stability, and most importantly its separation and permeation characteristics. In addition to the aforementioned considerations, it is frequently preferred that a prospective membrane polymer be commercially available at a moderate cost.

There are numerous references in the literature to membranes manufactured from polyimides. Makino et al. teach preparation of several specialty polyimides and membranes produced therefrom in U.S. Pat. Nos. 4,440,643; 4,460,526; 4,512,893; and 4,528,004. Chung et al. describe preparation of asymmetric hollow fibers for gas separation from fluorine-containing polyimides in the Journal of Membrane Science, 75 (1992), 181–195. This work is an example of a gas separation membrane fabricated from an expensive, custom synthesized polymer.

The fabrication of gas separation membranes from various polyimides has also been taught by Hoehn at al. in U.S. Pat. No. 3,899,309 and by Hayes in U.S. Pat. Nos. 4,838,900; 4,880,442; 4,932,982; and 4,932,983.

Two commercially available polyimides that are of interest as membrane forming materials because of their superior strength and chemical resistance are P84 and P84HT, manufactured by Lenzing A. G. The former material is reportedly a product of the reaction of benzophenone tetracarboxylic dianhydride (BTDA) with toluene diisocyanate (TDI) and methylene di p-phenyl diisocyanate (MDI). The latter polymer is reportedly a product of the reaction of pyromellitic dianhydride (PMDA) and BTDA with TDI and MDI. The polymers will hereinafter be referred to as BTDA/TDI-MDI and BDTA-PMDA/TDI-MDI polyimides respectively.

Another material with more advantageous separation properties is a polyimide that incorporates phenylindane moieties in the polymer chains. An example of such polyimide is Matrimid 5218, commercially available from Ciba Geigy Co. The polymer exhibits good combinations of gas permeability coefficients and separation factors for many gas pairs. The fabrication of asymmetric membranes from this polyimide has been reported by Wang et al. in U.S. Pat. No. 5,067,970. Ekiner et al. disclose the use of phenylindane-containing polyimides to prepare gas separation membranes in U.S. Pat. No. 5,015,270. While membranes described in the aforementioned patents display good gas separation characteristics, commercial use of these membranes can be limited because of the high cost of this specialty polymer.

The practice of blending polymers has been used effectively in the formation of gas separation membranes. Burgoyne, Jr. et al. in U.S. Pat. No. 5,061,298 disclose the use of blends of polyimide polymers as part of a process to prepare air separation membranes as shown. Yamada et al. in U.S. Pat. No. 4,832,713 disclose fabrication of gas separation membranes from blends of polyetherimide mixed with materials such as polycarbonates or polysulfones. Ekiner and Simmons, in U.S. Pat. No. 5,248,319 disclose the preparation of gas separation membranes from blends of polyimides in which one of the polymers contains phenylindane residues. The other polymer in the blend must incorporate aromatic diamine moieties that contain ether linkages. The selection of polyimide polymers that can be blended with phenylindane-containing polyimides according to the teachings of this patent are therefore severely limited.

It was discovered by us that integral anisotropic fluid separation membranes with superior combination of separation/permeation characteristics can be prepared from blends of BDTA/TDI-MDI and/or BTDA-PMDA/TDI-MDI polyimides and phenylindane-containing polyimides. These membranes can be utilized in preparation of porous substrates useful in the manufacture of composite membranes by solution coating processes.

SUMMARY OF THE INVENTION

This invention relates to improved fluid separation membranes and their preparation. More particularly, improved fluid separation membranes are prepared from blends of BTDA/TDI-MDI polyimides and/or BTDA-PMDA/TDI-MDI polyimides blended with phenylindane-containing polyimide polymers. A method of casting the membrane also forms a part of the invention.

It is therefore an object of the present invention to provide a fluid separation membrane from blends of BTDA/TDI-MDI and/or BTDA-PMDA/TDI-MDI polyimides and phenylindane-containing polyimide polymers wherein the membrane is an anisotopric membrane with a discriminating layer that is less than about 1000 Å thick. Other features and advantages of the present invention will become apparent from the following description of the invention.

DETAILED DESCRIPTION OF THE INVENTION

It has been discovered unexpectedly that blends of first and second polymers which are BDTA/TDI-MDI and/or BTDA-PMDA/TDI-MDI polyimides and phenylindane-containing polyimides, respectively, can be fabricated into membranes of superior separation performance. These membranes can be useful for microfiltration and ultrafiltration of fluids but are particularly useful for gas separation applications.

The first polymer in the blend is a membrane forming polyimide having the repeat unit:

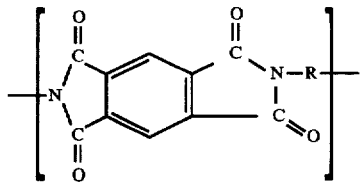

I where R is

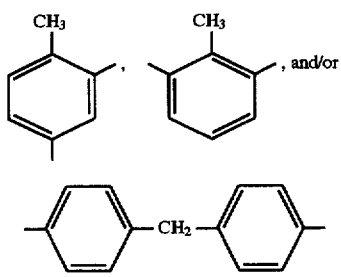

Alternatively, the first polyimide in the blend may be a copolymer containing the repeat units I and II.

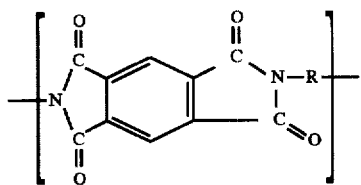   I

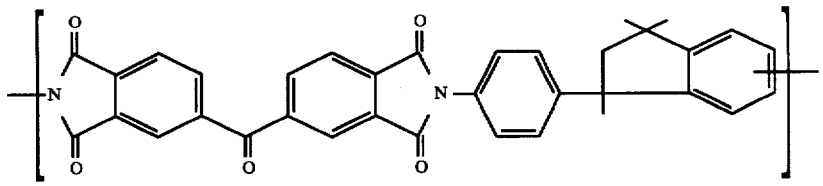   II where R is

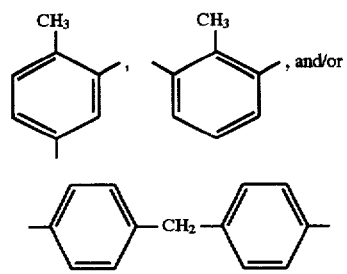

It is understood that the first polyimide component in this invention may be comprised of a BTDA/TDI-MDI polyimide, a BTDA-PMDA/TDI-MDI polyimide, or a mixture of two or more such materials in any proportion.

Preferred polymers are commercially available from Lenzing A.G. under the name P84 and P84HT.

The second polymer in the blend is a polyimide having phenylindane residues incorporated into the polyimide backbone chain. Such residues are of the formula:

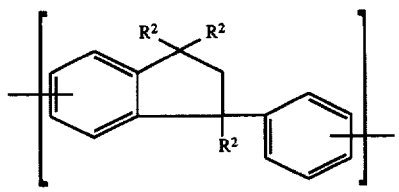

where each R group is independently hydrogen or lower alkyl of 1 to 6 carbon atoms. Like the first polymer, the second phenylindane-containing polyimide polymer has a sufficient molecular weight to allow it to be formed into a thin film.

The phenylindane residue may be incorporated within the diamine function, the dianhydride function or both.

The most preferred phenylindane-containing polyimide is that commercially available as Matrimid 5218 from Ciba Geigy Co. and the repeat unit of this polymer is believed to be as follows:

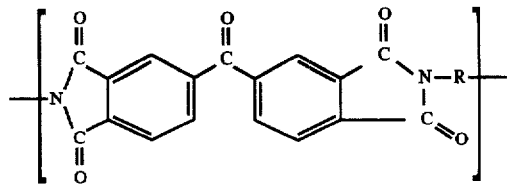

This polyimide can be prepared as taught in U.S. Pat. No. 3,856,752.

The membranes of this invention are prepared by solution casting methods. Thus, the polyimide and phenylindane-containing polyimide blended in particular weight ratios are dissolved in a common membrane forming solution known in the art as a casting solution or spinning dope. The polymer content of casting solutions typically is about 10 to 45% by weight and preferably about 25 to 35% by weight. The solutions of this invention, in addition to two membrane forming polymers, will also contain solvent and optionally nonsolvent components. The membrane casting process typically involves a solidification step in which the membrane forming solution is coagulated by bringing it in contact with a nonsolvent or a solvent/nonsolvent mixture. It is desirable that the solvent components of the membrane forming solution are miscible in the coagulation media. Thus if the coagulation media is aqueous in nature, then water miscible solvents may be advantageously employed in the preparation of the membrane forming solutions of this invention. Preferred solvents include dimethyl formamide and N-methyl pyrrolidone and their mixtures. The nonsolvent components that are used to formulate the membrane forming solution may be solids or liquids. These components are useful in controlling solution viscosity as well as the porosity and other membrane properties. Typical of the nonsolvents that are useful in formulating membrane casting solutions are aliphatic alcohols, particularly polyhydric alcohols such as ethylene glycol, glycerine, etc., polyethylene oxides and polypropylene oxides; surfactants such as alkylaryl polyether alcohols, alkylaryl sulfates, alkyl sulfates, etc.; triethylphosphate; formamide; aliphatic acids such as acetic or propionic acid etc.; and salts such as zinc chloride, lithium chloride etc.

Membranes can be cast from an appropriate polymer blend solution by a variety of methods. Preferred methods are dry/wet or wet/wet phase inversion processes. The processes can be used to produce membranes in any desired configuration such as flat sheet, tubular or spiral wound configuration, but it is preferred to form membranes of this invention in the form of hollow fibers. In a preferred embodiment of this invention the membranes are spun into hollow fiber configuration by the process described by Bikson et al. in U.S. Pat. No. 5,181,940. This patent teaches a method of producing highly anisotropic hollow fibers useful as permselective gas separation membranes and as substrates for preparation of composite membranes by extruding a spinning solution through a tube-in-orifice spinnerette into a gas filled chamber maintained at reduced pressure followed by coagulation and solidification step. Spinning solutions formulated from blends of polyimide and phenylindane-containing polyimide can be advantageously spun into hollow fibers utilizing this spinning method. The weight ratio of phenylindane-containing polymer to BTDA/TDI-MDI and BTDA-PMDA/TDI-MDI polyimide polymers is typically less than about 1.0. In some embodiments, the ratio may be as low as about 0.01. Preferably the ratio is about 0.3 to 0.1.

A distinguishing feature of blend membranes of present invention is the fact that they are anisotropic and contain an integral discriminating layer. This layer is less than 1000 Å thick, preferably less than 500 Å thick, most preferably less than 250 Å thick. The discriminating layer is distinguishable from the main membrane body by somewhat decreased porosity (i.e., increased density). The porosity of the discriminating layer (defined as the ratio of the area occupied by pores to the total area of the discriminating layer) will vary from about $4 \times 10^{-2}$ to below $10^{-6}$. Low porosity is most desirable for integral asymmetric membranes, in particular integral asymmetric gas separation membranes, while high levels of surface porosity are particularly useful for preparation of composite gas separation membranes. The discriminating layer is typically located at the exterior membrane surface. Hollow fiber membranes may contain the discriminating layer at the exterior or the interior wall. It is also possible for the discriminating layer to be located in the interior of the membrane, preferably close to membrane surface.

The membranes of this invention are highly anisotropic and can be prepared with very thin discriminating layers which are most preferably less than 250 Å thick. Discriminating layer thicknesses of these magnitudes can be advantageously achieved by the aforementioned vacuum spinning technique. The hollow fiber wall morphology and the thickness of membrane discriminating layer can be further modified through the use of coagulants that may include such solvents as alcohols and solvent/nonsolvent mixtures. However, the most often used coagulant is water or mixtures of water with solvents, surfactants and salts.

The anisotropic membranes of this invention are uniquely suited for preparation of composite and multicomponent gas separation membranes. These membranes can be advantageously prepared by solution coating methods. Examples of such methods are shown in U.S. Pat. Nos. 5,076,916; 4,840,819; 4,826,599; 4,756,932 and 4,467,001. The coating is deposited onto the discriminating layer of the membrane and in some embodiments can partially or completely occlude the pores. The coating material, the coating morphology and coating thicknesses can be selected by those skilled in the art to meet the needs of specific gas separation applications. Dense ultra-fine coatings as thin as 500 Å or less can be successfully formed on the surfaces of the blend membranes of this invention by solution deposition methods.

A broad range of solvents can be utilized in the preparation of coated membranes. The preferred solvents include aliphatic hydrocarbons including cycloaliphatic hydrocarbons, such as hexane, heptane and cyclohexane; alcohols such as ethanol, isopropanol and their mixtures with water; certain chlorinated hydrocarbons, in particular 1,1,1-trichloroethane and its mixtures with 1,2-dichloropropane and cyclohexane; organic acids such as acetic acid and ketones, in particular mixtures of methyl ethyl ketone with alcohols and cyclohexane, and the like. In one embodiment of this invention high surface porosity hollow fibers (i.e. hollow fibers with high discriminating layer porosity) are advantageously produced from blends of polyimide and phenylindane-containing polyimides. Such membranes can be utilized directly in fluid separation applications such as ultrafiltration or as substrates for manufacturing of composite fluid separation membranes.

In another embodiment, hollow fibers are coated with high gas permeability materials. These coated membranes may be useful for gas and vapor separation applications such as oxygen enrichment or organic vapor removal from air. Coating materials that can be advantageously employed to prepare composite membranes of this type include siloxanes such as polydimethyl siloxane, polybutadiene and ethylene-propylene-diene monomer (EPDM) rubbers and the like.

In yet another embodiment, it may be desirable to coat the high surface porosity hollow fibers with a high gas separation factor glassy polymer, which to a large extent determines the gas separation characteristics of the composite membrane. Examples of such materials include sulfonated polarylethers, sulfonated poly(phenylene oxides), polyesters, polyestercarbonates, and cellulosic derivative polymers such as cellulose acetate and blends of cellulose acetate with poly(methyl methacrylate) to name a few. Detailed description of chemical structure and preparation methods for some of these materials can be found in U.S. Pat. Nos. 5,071,498; 5,055,114; 4,994,095; 4,971,695; 4,919,865; and 4,874,401. These composite membranes are most suitable for air separation applications, acid gas separations, or hydrogen/methane separations. Composite membranes such as these can occasionally have minor defects that can be further repaired by post-treatment methods with solvents and dilute solutions of polymers and reactive additives. Post-treatment procedures of this type are taught by Bikson et al. in U.S. Pat. Nos. 4,767,422 and 5,131,927.

In a further embodiment of this invention low surface porosity hollow fiber membranes are produced from blends of BTDA/TDI-MDI or BTDA-PMDA/TDI-MDI polyimides and phenylindane-containing polyimide. Such membranes can be utilized directly for fluid separations or further coated prior to use. In some embodiments such as gas separation applications, the dry-wet spun hollow fiber membranes can be dried by air drying or other prior art processes prior to use. For example, membranes spun into water baths can be dehydrated by methods shown in U.S. Pat. Nos. 4,080,743 and 4,120,098. In another embodiment it may be desirable to overcoat these membranes with a high gas permeability material such as silicone rubber to repair residual defects in the membrane separation layer prior to use. High gas permeability, low separation factor elastomeric coatings are frequently used to repair minor defects that occur in highly asymmetric low surface porosity membranes. Preparation of such multicomponent gas separation membranes is described in U.S. Pat. No. 4,230,463. In other cases, it may be advantageous to coat these low surface porosity hollow fibers with high gas separation factor materials that contribute to the overall gas separation characteristics of the composite membrane. These high gas separation factor materials are frequently glassy polymers. Representative examples of such polymers include polyesters, polyestercarbonates, sulfonated polysulfones and sulfonated poly(phenylene oxides), cellulosic derivative polymers, such as cellulose acetate or blends of cellulose acetate with polymethyl methacrylate to name a few. Coating of these glassy polymers onto low surface porosity hollow fibers often yields an essentially defect-free composite gas separation membrane with an attractive combination of permeation and separation characteristics.

Processes for spinning polyimides are well known in the art and some examples have been cited. These processes generally require injection of a liquid bore medium in order to keep hollow fiber bores open during the spinning process. These fluids generally consist of solvents, solvent/nonsolvent mixtures or a swelling agent for the membrane forming material. Bore fluids frequently can adversely effect final membrane properties. For example, bore fluids often cause undue densification of porous walls or increase thickness of the membrane discriminating layer. If the discriminating layer is desired at the exterior hollow fiber surface, certain coagulating bore fluids can lead to unwanted barrier layers at the interior wall of the hollow fiber bore. Thus it is frequently advantageous to spin hollow fibers with an inert, noncoagulating gaseous bore medium. The addition of phenylindane containing polyimide to polyimide based spin dopes was found to be beneficial in this regard. Phenylindane-containing polyimide, when admixed with BTDA/TDI-MDI or BTDA-PMDA/TDI-MDI polyimides to form spin dopes of this invention, were found to enhance the spinnability of the solution such that a hollow fiber could be formed by injecting air rather than a solvent into the nascent fiber bore. Furthermore, membranes composed of polymer blends of this invention are tougher and more flexible than those fabricated from a polyimide only.

It is known that blends of BTDA/TDI-MDI or BTDA-PMDA/TDI-MDI polyimides and phenylindane-containing polyimides of this invention are miscible in the membrane forming solution described herein. However, a definitive mechanism by which these polymer blends serve to produce improved membranes of this invention is not precisely known.

The following examples will serve to illustrate the utility of this invention but should not be construed as limiting.

EXAMPLE 1

A solution was prepared by mixing 283.3 g of a phenylindane-containing polyimide, sold commercially by Ciba-Geigy under the name of Matrimid 5218, with 2216.7 g of a 25% solution of a polyimide P84HT, sold by Lenzing A. G., in dimethyl formamide. This latter polymer is reportedly a copolymer made from the reaction of both benzophenone tetracarboxylic dianhydride (BTDA) and pyromelletic dianhydride (PMDA) with toluene diisocyanate and/or 4,4' methylene bis-phenylisocyanate.

The resulting solution was deaerated, filtered, and spun into hollow fibers using the vacuum spinning process described by Bikson et al. in U.S. Pat. No. 5,181,940. The casting solution was extruded at 71° C. through a tube-in-orifice spinnerette with an orifice diameter of 0.14 cm and a tube outside diameter of 0.10 cm into an enclosed chamber with a vacuum level maintained at 14 cmHg. Air was metered through the core of the spinnerette tube to produce a hollow bore in the extrudate.

The nascent hollow filament passed through a gap of 5.1 cm and into a coagulation fluid that consisted essentially of a 0.05% V/V solution of Triton X100 maintained at 45° C. The coagulated hollow fiber, which had an outside diameter of 0.043 cm and an inside diameter of 0.018 cm, was collected at a rate of 30.5 meters per minute. The coagulated hollow filament was washed with a 90/10 V/V solution of isopropanol/water to remove residual solvent. The fiber was immersed successively in methanol and Freon 113, dried, coated with a 6% solution of polydimethyl siloxane in cyclohexane, and heated to remove the cyclohexane.

This coated fiber was assembled into modules containing eight fibers about 40.5 cm long. These modules were tested for air separation characteristics at 7.03 Kg/cms and about 23° C. The membrane was found to have an oxygen permeation rate ($O_2$ P/t) of $1.8 \times 10^{-5}$ cm$^3$/cm$^2$ cmHg sec and a separation factor for oxygen/nitrogen of 6.5.

EXAMPLE 2

A hollow fiber spinning solution was prepared by mixing 250 g of Matrimid 5218, 250 g of dimethyl formamide, and 2000 g of a 25% by weight solution of P84 (Grade T-70) polymer, sold by Lenzing A.G., in dimethyl formamide. This latter polymer is a polyimide reportedly prepared from the reaction of benzophenone tetracarboxylic dianhydride with toluene diisocyanate and/or 4,4'-methylene bis-phenylisocyanate.

The solution was deaerated, filtered and spun into hollow fibers in the vacuum spinning apparatus as described in Example 1. The spinnerette had an orifice diameter of 0.14 cm and an injection tube outside diameter of 0.10 cm. The casting solution was extruded through the spinnerette at 49° C. as air was metered through the core of the spinnerette tube to produce a hollow filament stream. This nascent hollow fiber traveled through a gap of 2.5 cm in the vacuum chamber and was then coagulated in a 0.05% V/V solution of Triton X100 in water maintained at 45° C. The coagulated filament, which had an outside diameter of 0.042 cm and an inside diameter of 0.018 cm, was collected at a rate of 30.5 meters/minute, washed with 90/10 V/V solutions of isopropanol/water, dried and coated with a 6% solution of polydimethyl siloxane in cyclohexane as in Example 1.

The coated hollow fiber membrane was fabricated into modules and tested for air separation characteristics as in Example 1. The membrane was found to have an oxygen permeation rate ($O_2$ P/t) of $8.2 \times 10^{-5}$ cm$^3$/cm$^2$ cmHg sec and a separation factor for oxygen/nitrogen of 2.6.

Various changes and modifications can be made in the products and processes described above without departing from the spirit and scope of the invention. The various embodiments which were described herein were set forth for the purpose of illustration only and were not intended to limit the invention. It will also be appreciated that the temperatures are in degree Centigrade and all parts and percentages are by weight unless otherwise indicated.

What is claimed is:

1. An anisotropic fluid separation membrane having an integral discriminating layer consisting essentially of a blend of first and second polymers, said first polymer being a polyimide reaction product of (1) a benzophenone tetracarboxylic dianhydride with toluene diisocyanate and methylene di p-phenyl diisocyanate and/or (2) benzophenone tetracarboxylic dianhydride with pyromellitic dianhydride, toluene diisocyanate and methyl di p-phenyl diisocyanate, and the second polymer being a phenylindane-containing polyimide in a ratio of about 1:0.01 to 1:1.

2. The membrane of claim 1 wherein the discriminating layer is less than about 1,000 Angstroms thick.

3. The membrane of claim 2 wherein the discriminating layer is less than about 500 Angstroms thick.

4. The membrane of claim 1 wherein the discriminating layer has surface porosity of about 0.04 to $10^{-6}$.

5. The membrane of claim 4 wherein the first polymer is the reaction product of benzophenone-3,3',4,4-tetracarboxylic acid dianhydride and pyromellitic dianhydride with toluene diisocyanate and/or 4,4'-methylene-bis and a second polymer has repeat unit:

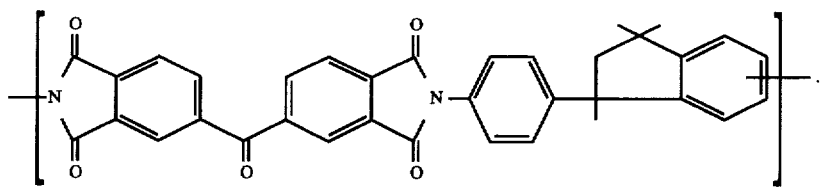

6. The membrane of claim 5 wherein the discriminating layer thickness is less than about 250 Angstroms.

7. The membrane of claim 1 wherein the first polymer is the reaction product of benzophenone-3,3',4,4-tetracarboxylic acid dianhydride and pyromellitic dianhydride with toluene diisocyanate and/or 4,4'-methylene-bis-phenylisocyanate, and a second polymer having the repeat unit:

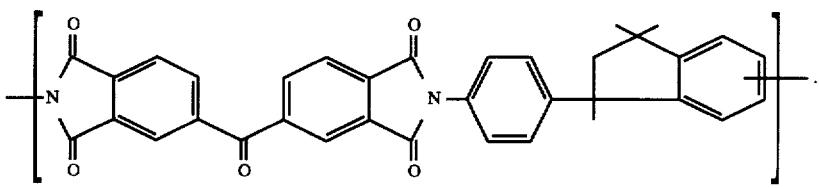

8. The membrane of claim 1 further having a coating deposited on the discriminating layer.

9. The membrane of claim 1 wherein the discriminating layer is at the membrane surface.

10. In a method of forming a hollow fiber membrane by extruding a polymer solution in the form of a hollow fiber into a gaseous atmosphere maintained at a subatmospheric pressure and solidifying the membrane in a liquid medium, the improvement consisting essentially of employing as said polymer solution a polyimide reaction product of a polyimide reaction product of (1) a benzophenone tetracarboxylic dianhydride with toluene diisocyanate and methylene di p-phenyl diisocyanate and/or (2) benzophenone tetracarboxylic dianhydride with pyromellitic dianhydride, toluene diisocyanate and methyl di p-phenyl diisocyanate, and said second polymer being a phenylindane—containing polyimide in a ratio of from about 1:0.1 to 1:0.3.

11. The method of claim 10 in which said polymer is a phenylindane—containing aromatic polyimide, and said ratio is from about 1:0.1 to 1:0.3.

12. The method of claim 11 wherein the first polymer comprises the reaction product of benzophenone-3,3',4,4-tetracarboxylic acid dianhydride with toluene diisocyanate and/or 4,4'-methylene-bis-phenylisocyanate and a second polymer having the repeat unit:

13. The method of claim 10 wherein the first polymer comprises the reaction product of benzophenone-3, 3',4,4-tetracarboxylic acid dianhydride with toluene diisocyanate and/or 4,4'-methylene-bis-phenylisocyanate and a second polymer having the repeat unit:

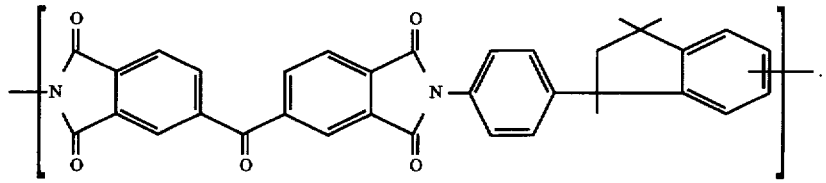

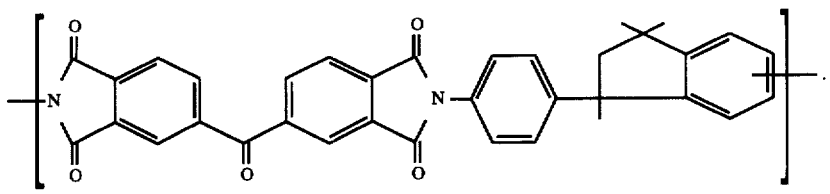

14. The method of claim 10 wherein gas is injected into the center of the hollow fiber as it is being extruded.

15. In a fluid separation process in which a fluid feed stream is contacted with a fluid separation membrane capable of selectively permeating one component of said fluid feed stream, with the more selectively permeable component being withdrawn as permeate fluid, and the less selectively permeable component being withdrawn as retentate fluid, the improvement consisting essentially of contacting said fluid feed stream with an anisotropic fluid separation membrane having an integral discriminating layer formed of a blend of first and second polymers, said first polymer being a polyimide reaction product of (1) a benzophenone tetracarboxylic dianhydride with toluene diisocyanate and methylene di p-phenyl diisocyanate and/or (2) benzophenone tetracarboxylic dianhydride with pyromellitic dianhydride, toluene diisocyanate and methyl di p-phenyl diisocyanate, and the second polymer being a phenylindane—containing polyimide in a ratio of about 1:0.01 to 1:1.

16. The process of claim 15 in which said fluid feed stream comprises a gas feed stream.

17. The process of claim 16 in which said gas feed stream comprises feed air.

18. The process of claim 15 in which the discriminiating layer is less than about 1,000 Angstroms thick.

19. The process of claim 18 in which the discriminating layer is less than 500 Angstroms thick.

20. The process of claim 15 in which said discriminating layer has a surface porosity of about 0.04 to $10^{-6}$.

* * * * *

UNITED STATES PATENT AND TRADEMARK OFFICE
CERTIFICATE OF CORRECTION

PATENT NO. : 5,635,067
DATED : June 3, 1997
INVENTOR(S) : James T. Macheras It is certified that error appears in the above-identified patent and that said Letters Patent is hereby corrected as shown below:

Column 9,
Claim 5, line 5, before "and" insert -- - phenylisocyanate --.

Signed and Sealed this

Sixteenth Day of September, 1997

Attest:

BRUCE LEHMAN

Attesting Officer

Commissioner of Patents and Trademarks